(12) United States Patent
Chang et al.

(10) Patent No.: US 8,687,068 B2
(45) Date of Patent: Apr. 1, 2014

(54) PATTERN OF COLOR CODES

(75) Inventors: Nelson Liang An Chang, San Jose, CA (US); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 12/885,528

(22) Filed: Sep. 19, 2010

(65) Prior Publication Data

US 2012/0069195 A1 Mar. 22, 2012

(51) Int. Cl.
*H04N 17/00* (2006.01)
*H04N 17/02* (2006.01)

(52) U.S. Cl.
USPC ........... 348/188; 348/175; 348/187; 356/419; 356/502; 356/3.28; 382/166; 382/167

(58) Field of Classification Search
USPC ........ 348/223.1, 188, 42, 148, 181, 175, 370, 348/222.1, 46, 184, 187; 382/167, 166; 396/182, 2; 356/243.8; 702/57
See application file for complete search history.

(56) References Cited

U.S. PATENT DOCUMENTS

| | | | |
|---|---|---|---|
| 7,032,823 B2 | 4/2006 | Noriji | |
| 7,307,654 B2* | 12/2007 | Chang | 348/218.1 |
| 7,570,282 B1* | 8/2009 | Kaplinsky | 348/188 |
| 2008/0062164 A1 | 3/2008 | Bassi et al. | |
| 2008/0166043 A1 | 7/2008 | Bassi et al. | |
| 2009/0166418 A1 | 7/2009 | Onoda et al. | |
| 2009/0242650 A1 | 10/2009 | Ushijima et al. | |
| 2010/0172020 A1* | 7/2010 | Price et al. | 359/381 |
| 2010/0225769 A1* | 9/2010 | Cho et al. | 348/188 |
| 2011/0216204 A1* | 9/2011 | Elwell | 348/184 |

FOREIGN PATENT DOCUMENTS

CN 200710049547 12/2007

OTHER PUBLICATIONS

J. Batlle et al., "Recent progress in coded structured light . . . ", Pattern Recognition, vol. 31, No. 7, year 1998.
J-Y Boughet, "Camera calibration toolbox for Matlab," http://www.vision.caltech.edu/bouguetj/calb_doc, Jul. 9, 2010.
J. Burns et al., "Coding schemes for two-dimensional position sensing," HPL-92-19, Jan. 1992.
F. Chung et al., "Universal cycles for combinatorial structures," Discrete Mathematics 110, year 1992.
K. Claes et al., "Robot positioning using structure light patterns . . . ", Int'l Conf. on Advanced Robotics, Korea, 2007.
T. Etzion, "Construction for perfect maps and pseudorandom arrays," IEEE Trans. on Information Theory, Sep. 1998.
F.J. MacWilliams et al., "Pseudo-random sequencies and arrays," Procs. of IEEE, vol. 64, No. 12, Dec. 1976.
R.A. Morano et al., "Structured light using pseudorandom codes," IEEE Trans. on Pattern Analysis & Machine Intelligence, Mar. 1998.
J. Salvi et al., "A robust-coded pattern projection for dynamic 3D scene measurement," Pattern Recognition Letters 19, year 1998.

(Continued)

*Primary Examiner* — Jefferey Harold
*Assistant Examiner* — Sihar Karwan

(57) ABSTRACT

A pattern includes a spatial configuration of color codes. Each color code is a unique configuration of colors selected from a number of basis colors. The color codes each include the same number of colors.

15 Claims, 4 Drawing Sheets

(56) References Cited

OTHER PUBLICATIONS

J. Salvi et al., "Pattern codification strategies in structured light systems," Pattern Recognition 37(4), pp. 827-849, Apr. 2004.

R.Y. Tsai, "A Versatile camera calibration technique . . .", IEEE J'l of Robotics and Automation, Aug. 1987.

L. Zhang et al., "Rapid shape acquisition using color structured light . . . ," Int'l Symp. on 3D Data Processing Visualization & Transmission, year 2002.

Z. Zhang, "A flexible new technique for camera calibration," IEEE Trans. on Pattern Analysis & Machine Intelligence, Nov. 2000.

Y-H Chen et al., "A Vision-based augmented-reality system for multiuser collaborative environments," IEEE Trans. on Multimedia, Jun. 2008.

M.C. Leung et al., "A project-based movable hand-held display system," Proc. IEEE CVPR, Jun. 2009.

D. Wagner et al., "Pose tracking from natural features on mobile phones," Proc. ISMAR, 2008.

J. van de Weijer et al., "Color edge detection by photometric quasi-invariants," Procs. of 9th IEEE Int'l Conf. on Computer Vision, year 2003.

E.S. Bhasker, "Asynchronous distributed calibration . . . ", IEEE Trans. on Visualization & Computer Graphics, Sep./Oct. 2006.

\* cited by examiner

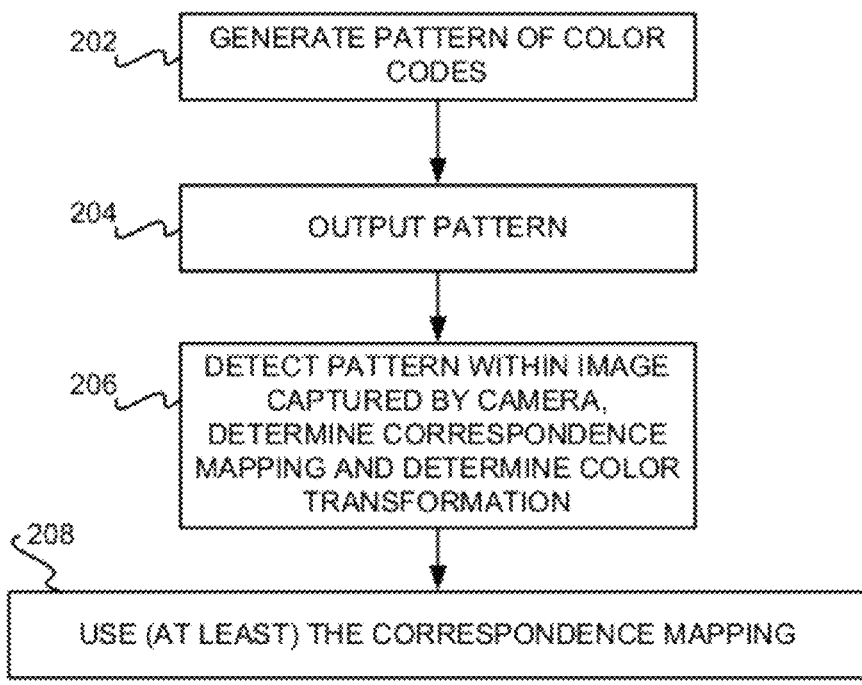
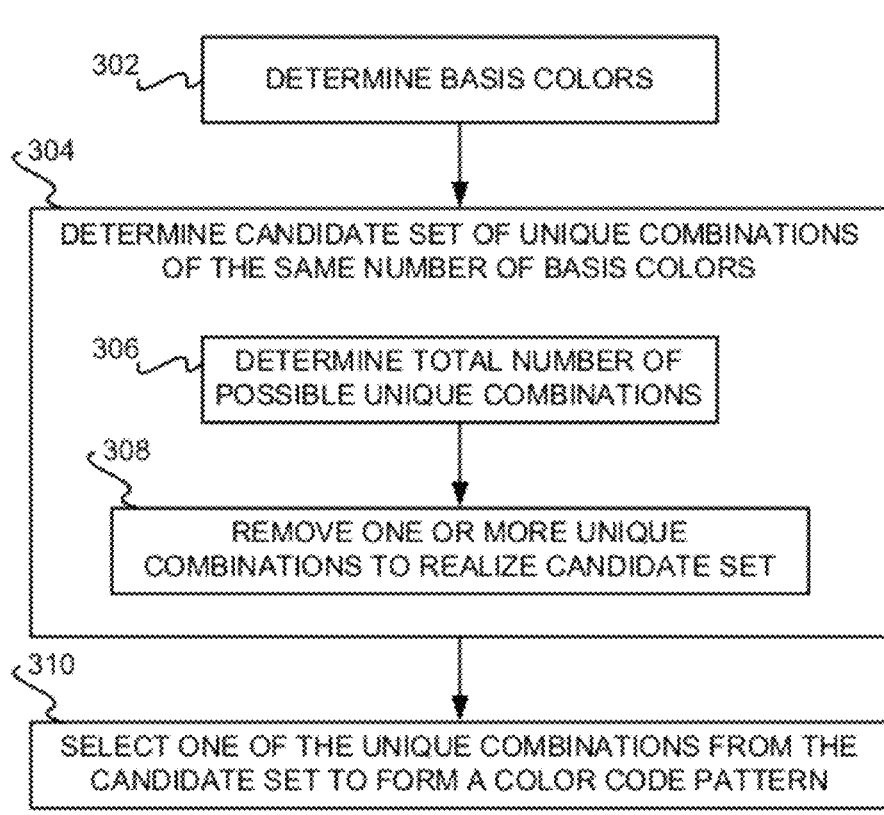

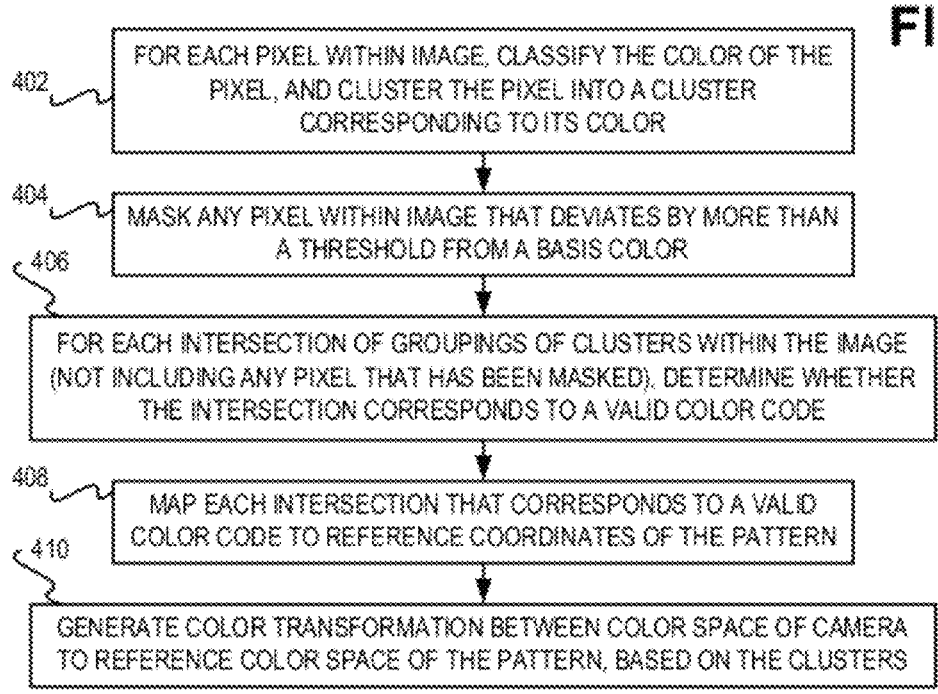
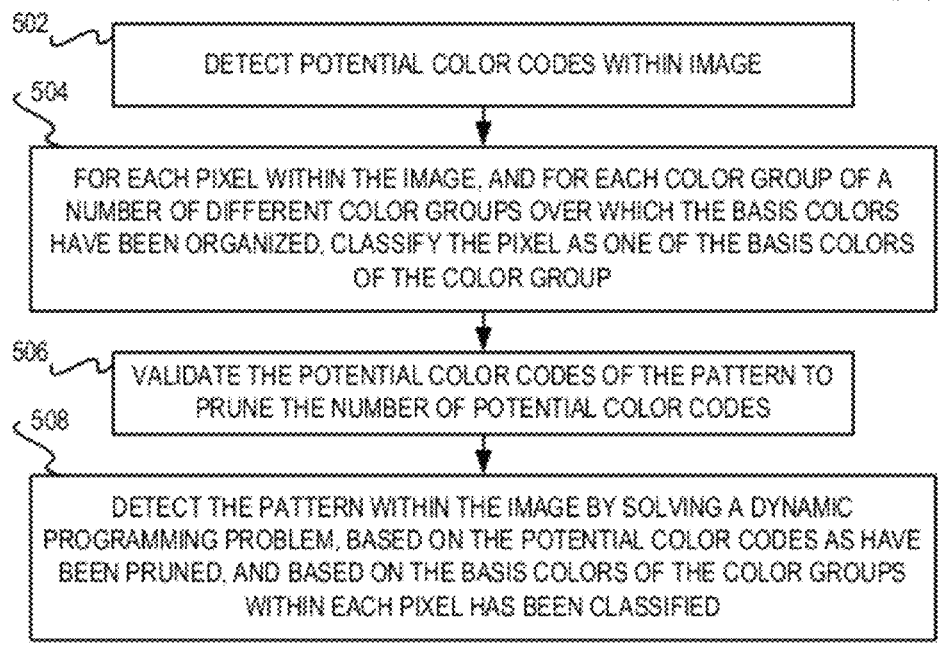

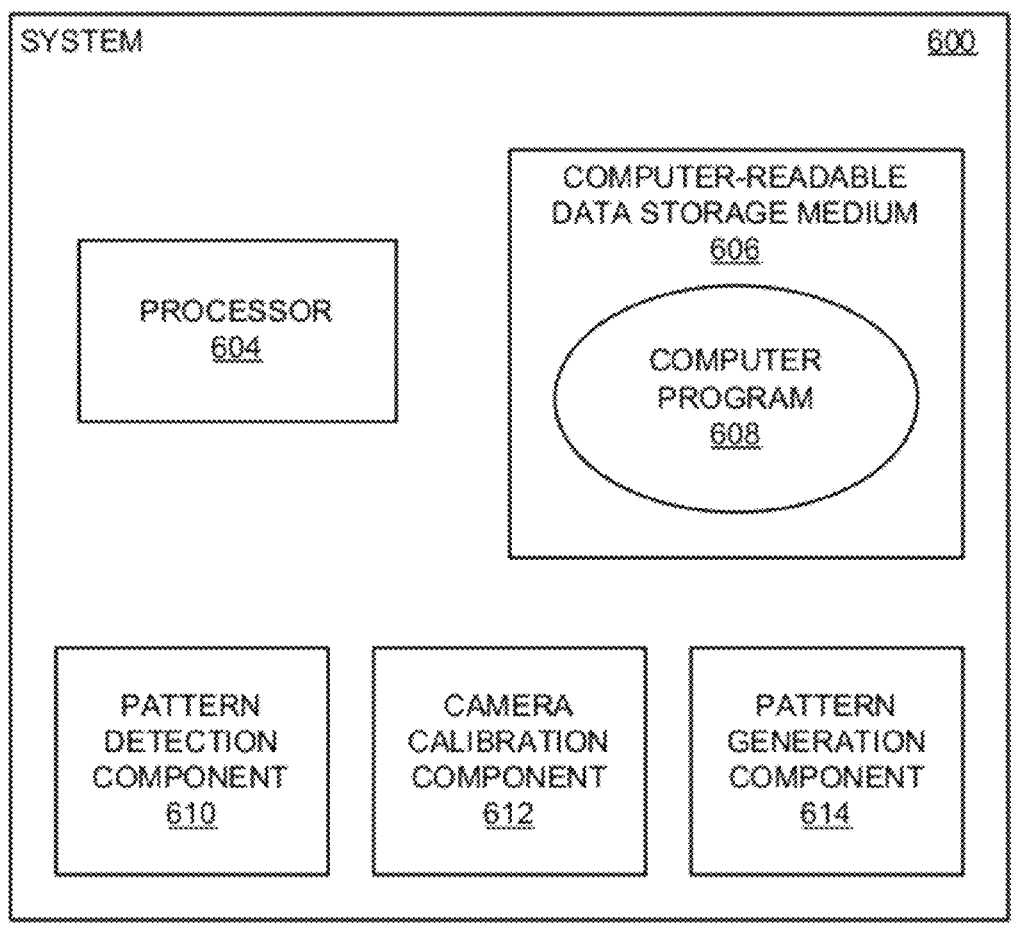

US 8,687,068 B2

PATTERN OF COLOR CODES

BACKGROUND

Cameras, such as video cameras, typically are calibrated so that they can record images in an accurate manner. One type of calibration is color calibration, which ensures that the colors within the images recorded by a video camera are accurate. Another type of calibration is geometric calibration, which corrects for issues such as lens distortion, and which also provides the relative position and orientation of the camera.

BRIEF DESCRIPTION OF THE DRAWINGS

FIG. 2 is a flowchart of a method, according to an example of the disclosure.

FIG. 3 is a flowchart of a method for generating a pattern of color codes, according to an example of the disclosure.

FIG. 4 is a flowchart of a method for determining at least a correspondence mapping between the spatial coordinates of a pattern of color codes detected within an image captured by a camera and the reference spatial coordinates of the pattern as is known a priori, according to an example of the disclosure.

FIG. 5 is a flowchart of a method for determining at least a correspondence mapping between the spatial coordinates of a pattern of color codes detected within an image captured by a camera and the reference spatial coordinates of the pattern as is known a priori, according to another example of the disclosure.

FIG. 6 is a diagram of a system, according to an example of the disclosure.

DETAILED DESCRIPTION

As noted in the background section, cameras, such as video cameras, are typically both color calibrated and geometrically calibrated so that they can accurately record images. Reference patterns are typically used to perform camera calibration. For example, for color calibration, a reference pattern such as a Macbeth chart can be used to estimate the color transformation between a reference color space and the camera's color space. For geometric calibration, a reference pattern referring to specific real-world coordinates can be used to reduce the effects of lens distortion, and to provide the relative position and orientation of the camera. Within the prior art, then, one type of reference pattern is used to perform color calibration, and another type of reference pattern is used to perform geometric calibration. Having such reference patterns permits an accurate mathematical model to be derived which predicts the behavior and characteristics of the camera.

Examples of the disclosure provide a single pattern that can be used to perform both color calibration and geometric calibration of a camera like a video camera, among other tasks. The pattern includes a spatial configuration of a number of color codes. Each color code is a unique configuration of colors selected from a number of basis colors. As one example, each color code overlaps one or more other color codes within the pattern. The color codes each include the same number of colors.

The pattern thus encodes both geometric information and color information, which can be used to perform geometric calibration and color calibration, respectively. The spatial configuration of the color codes relative to one another and the spatial configuration of the colors relative to one another within each color code can make up the geometric information. By comparison, the various colors themselves of the color codes can make up the color information.

Figure 1A:
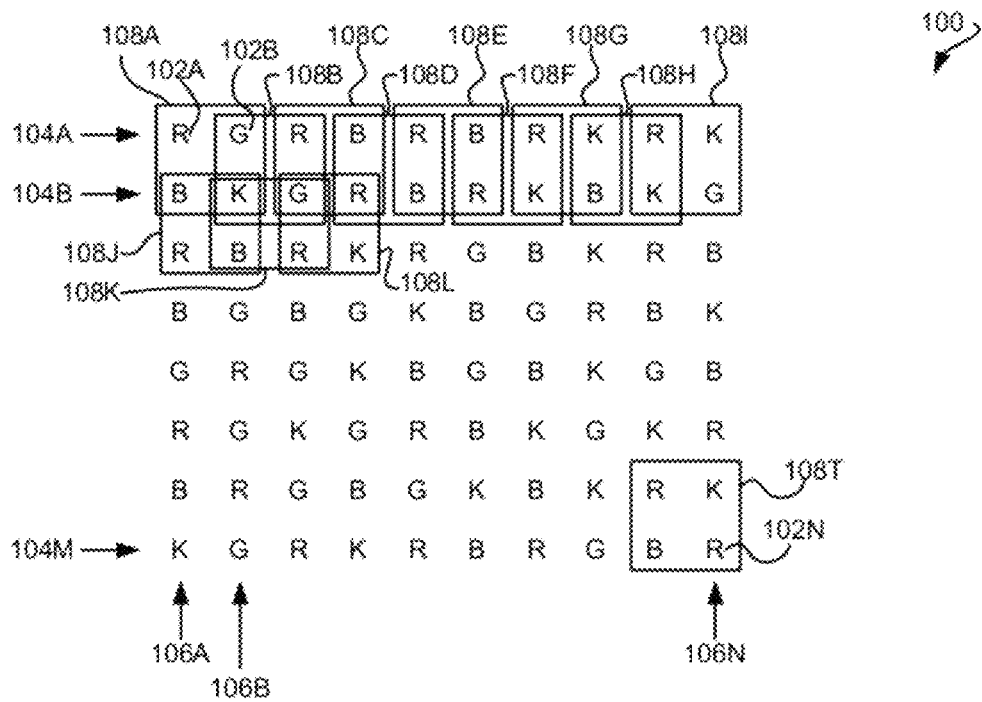
FIG. 1A is a diagram of a pattern of color codes, according to an example of the disclosure.

FIG. 1A shows a representative pattern 100, according to an example of the disclosure. The pattern 100 includes colors 102A, 102B, . . . , 102N, collectively referred to as the colors 102. Each color 102 is one of four basis colors. In the example of FIG. 1A, the basis colors are red ("R"), green ("G"), blue ("B"), and black ("K"). However, the basis colors for other patterns may include other colors, in addition to and/or in lieu of red, green, blue, and black. For instance, the basis colors may include cyan, magenta, yellow, and/or white, in addition to and/or in lieu of red, green, blue, and black.

The colors 102 are organized in the pattern 100 as a rectangular grid having a number of rows 104A, 104B, . . . , 104M, collectively referred to as the rows 104, and a number of columns 106A, 106B, . . . , 106N, collectively referred to as the columns 106. In the example of FIG. 1A, there are eight rows 104 and ten columns 106, such that the pattern 100 is an eight colors-by-ten colors grid. More generally, there are M rows 104 and N columns 106. Furthermore, the colors 102 may be organized in a manner other than a rectangular grid.

The pattern 100 includes a spatial configuration of color codes 108A, 108B, 108C, 108D, 108E, 108F, 108G, 108H, 108I, 108J, 108K, 108L, . . . , 108T, collectively referred to as the color codes 108. For illustrative clarity, not all the color codes 108 are depicted in FIG. 1A. In the example of FIG. 1A, there are actually sixty-three color codes 108.

A color code 108 is defined as follows. First, each color code 108 is a unique configuration of colors 102 selected from the basis colors. For instance, the color code 108A includes red in the upper left-hand corner, green in the upper right-hand corner, blue in the lower left-hand corner, and black in the lower right-hand corner. There is no other color code 108 in the pattern 100 that has these four colors in these four positions. There may be other color codes 108 that include red, green, blue, and black, but not in the same positions as in the color code 108A. As such, the color code 108 is said to be a unique configuration of the colors 102.

Second, each color code 108 overlaps other color codes 108 within the pattern 100. For instance, the color codes 108A, 108I, and 108T that are located on the corners of the pattern 100 each overlap three other color codes 108. As a specific example, the color code 108A overlaps the color codes 108B, 108J, and 108K. Furthermore, the color codes 108B, 108C, 108D, 108E, 108F, 108G, 108H, and 108J that are located on the edges of the pattern 100 but that are not on the corners of the pattern 100 overlap five other color codes 108. As a specific example, the color code 108B overlaps the color codes 108A, 108C, 108J, 108K, and 108L. Finally, each color code 108 that is not on an edge or a corner of the pattern 100 overlaps eight other color codes 108.

Third, the color codes 108 each include the same number of colors 108. In the example of FIG. 1A, each color code 108 includes four colors organized as a two color-by-two color rectangular grid. More generally, each color code 108 may be organized as an R colors-by-S colors rectangular grid. For a pattern 100 that is an M colors-by-N colors grid, there are (R−M+1)×(S−N+1) R colors-by-S colors color codes 108, where there are $C^{R \times S}$ unique color codes 108 for C different basis colors. Furthermore, it is noted that even more generally still, each color code 108 may be organized in a manner other than a rectangular grid.

It is further noted that in the example of FIG. 1A, the pattern 100 is defined as including all two color-by-two color rectangular grids as the color codes 108. That is, every possible two color-by-two color rectangular grid in the pattern 100 is considered to be a color code 108 of the pattern 100. No two color-by-two color rectangular grids are excluded in the pattern 100 from being a color code 108, in other words. As other examples, however, certain locations within the pattern 100 can be ignored and do not have to correspond to valid color codes 108, although the identities of these locations would be known a priori when it comes time to detect the pattern 100 within a captured image.

Fourth, each color code 108 has one or more reference spatial coordinates within the pattern 100 that spatially locate the color code 108 within the pattern 100. As a rudimentary example, the color codes 108 may be consecutively numbered, where it is known a priori that a given reference number (i.e., coordinate) corresponds to a particular location within the pattern 100. As another example, the pattern 100 may have row numbers and column numbers, such that a given reference pair of a row number and a column number (i.e., coordinates) corresponds to a particular location within the pattern 100.

As a third example, the pattern 100 may have units along an x-axis and along a y-axis, such as pixels, units of length, and so on. A particular color code 108 is spatially located in this example by a pair of reference numbers (i.e., coordinates) along the x- and y-axes. The pair of reference numbers may specify the center point of the color code 108, or another predetermined part of the color code 108, such as its upper left-hand pixel, and so on. In general, this pair of reference numbers specifies a fixed, known, and detectable position within the pattern 100 relative to the color code 108 in question.

The pattern 100 of color codes 108 that has been described can aid in the geometric calibration and the color calibration of a camera like a video camera. For instance, a sheet of paper or cardboard on which the pattern 100 has been printed may be situated within the field of view of the camera. Alternatively, a projector may be employed to project the pattern 100 onto a surface within the field of view of the camera. An image including the pattern 100 is then captured by the camera.

For geometric calibration of the camera, the spatial coordinates of the color codes 108 are detected within the image captured by the camera. A comparison of these detected spatial coordinates to the reference spatial coordinates of the color codes 108 within the original pattern 100 can be used to provide the relative position and orientation of the camera, as well as to measure the effects of lens distortion, among other issues and artifacts, to reduce these deleterious effects. Therefore, it is said in this respect that the pattern 100 encode geometric information.

For color calibration of the camera, the colors 102 of the color codes 108 can be quantified (i.e., measured), to estimate the color transformation between a reference color space and the color space of the camera. Therefore, it is said in this respect that the pattern 100 encodes color information. For instance, for the red-green-blue color space, the difference between the actual color red within the pattern 100 and the measured color red within the pattern 100 can be used to estimate this color transformation with respect to the color red.

The mapping of the spatial coordinates of the color codes 108 as detected within the image captured by the camera to the reference spatial coordinates of the color codes 108 within the original pattern 100 is referred to as a correspondence mapping. This mapping, which can be estimated, permits the pattern 100 of color codes 108 to be used for purposes other than color calibration and geometric calibration. For instance, the pattern 100 can be used as a substitute for a blue or green screen. In general, a blue or green screen is detected by a camera, and processing of the image captured by the camera results in substitution of a different image in place of the blue or green screen. This approach, which is known as chroma keying or chroma key compositing, is used, for instance, during weather reports on local news broadcasts. The weather person in actuality points to a screen, and a weather map is electronically substituted for the screen in the image that is broadcast.

The pattern 100 of color codes 108 is advantageously employed, particularly in the case where there is a priori knowledge of the basis colors of the pattern 100, permissible color codes 108 within the pattern 100, and/or permissible (i.e., possible) patterns 100, on which basis the pattern 100 is detected within an image captured by a camera. For instance, the pattern 100 that is to be detected within an image captured by a camera may be known beforehand. Therefore, even if the pattern 100 is partially obscured or blocked within the image, the pattern 100 can be more easily detected within the image. As compared to blue or green screens, the pattern 100 provides for less false positives—i.e., the detection of the pattern 100 where it is not actually present within the image. Furthermore, the pattern 100 provides for better granularity or higher resolution in detecting the edges of the pattern 100, and in detecting exactly where the pattern 100 is partially obscured or blocked within the image, as compared to blue or green screens in particular. Furthermore, the pattern 100 permits the background content to be more accurately blended back into the image captured by the camera, since the pattern 100 provides for color calibration of the camera as well.

Figure 1B:
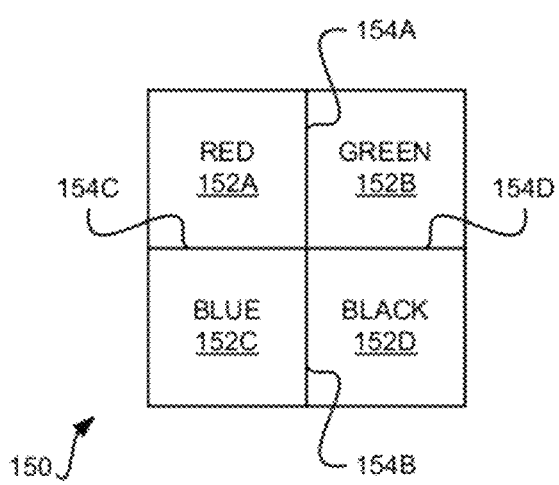
FIG. 1B shows an example color code of the pattern shown in FIG. 1, according to an embodiment of the disclosure.

FIG. 1B shows an example color code 150, according to an example of the disclosure. The color code 150 is particularly the color code 108A of the pattern 100 of FIG. 1. The color code 150 has four colors 152A, 152B, 152C, and 152D, which are collectively referred to as the colors 152, and which are in the example of FIG. 1B red, green, blue, and black, respectively. There is a boundary 154A between adjacent color codes 152A and 152B; a boundary 154B between adjacent color codes 152C and 152D; a boundary 154C between adjacent color codes 152A and 152C; and, a boundary 154D between adjacent color codes 152B and 152D. The boundaries 154A, 154B, 154C, and 154D are collectively referred to as the boundaries 154, and may also be called the edges of the color code 150.

The red color 152A thus abuts the green color 152B at the boundary 154A. As such, there is no gap between the green color 152B and the red color 152A. Similarly, the blue color 152C abuts the black color 152D at the boundary 154B, and there is no gap between the colors 152C and 152D. Likewise, the colors 152A and 152D abut one another at the boundary 154C such that there is no gap between the colors 152A and 152B, and the colors 152B and 152D abut one another at the boundary 154D such that there is no gap between the colors 152B and 152D.

FIG. 2 shows a method 200, according to an example of the disclosure. At least some parts of the method 200 may be performed by a processor of a computing device like a computer. At least some parts of the method 200 may be implemented by a computer program stored on a non-transitory computer-readable data storage medium, such as a volatile medium like dynamic random access memory or a non-volatile medium like a hard disk drive or flash memory. Execution of the computer program by a processor of a computing device thus results in the performance of these parts of the method 200.

The method 200 generates the pattern 100 that includes a spatial configuration of color codes 108 (202). As noted above, each color code 108 includes a unique configuration of the colors 102 of the pattern 100, where the colors 102 are selected from a number of basis colors. As also noted above, each color code 108 overlaps one or more other color codes 108, and each color code 108 includes the same number of colors 102. The pattern 100 encodes both geometric information and color information, such that the pattern 100 is adapted to aid both geometric calibration and color calibration of a camera.

The method 200 then outputs the pattern 100 (204). For instance, the pattern 100 may be first stored on a non-transitory computer-readable data storage medium. Ultimately, the pattern 100 can be printed on a physical medium, like a sheet of paper or cardboard, using a printing device like a printer. Additionally or alternatively, the pattern 100 can be electronically displayed using a display device. For instance, as noted above, a projector may be used to project the pattern 100 on a real-world surface.

The pattern 100 is then detected within an image captured by a camera, and the correspondence mapping between the spatial coordinates of the pattern 100 as detected within the image and the reference spatial coordinates of the original pattern 100 as known a priori (i.e., beforehand) are determined (206). A color transformation between colors of the pattern 100 as detected within the image and the colors of the pattern 100 as known a priori (i.e., beforehand) can also be determined in part 206. At least the correspondence mapping is then used (208). For instance, the correspondence mapping may be used to aid geometric calibration of the camera, as a substitute for a blue or green screen, and so on. As another example, the correspondence mapping in combination with the color transformation can be used to aid color calibration of the camera.

It is noted that the method 200 can be performed for a number of different cameras capturing different images of the same pattern 100. The cameras in this situation are typically positioned differently relative to one another, and relative to the pattern 100. Therefore, the same pattern 100 can be used to determine the relative positions of the cameras.

FIG. 3 shows a general method 300 for generating the pattern 100 in part 202 of the method 200, according to an example of the disclosure. A number C of basis colors—including the color of each basis color and how many basis colors there are—is determined (302). In one example, the basis colors may be the colors of one or more different color spaces. For instance, the basis colors may be selected from the red-green-blue color space, the cyan-magenta-yellow color space, and/or the black-and-white color space. However, the basis colors can be colors in addition to and/or in lieu of the colors of one or more color spaces.

A candidate set of unique combinations of the basis colors is determined (304), based on the total number of possible unique combinations of the basis colors. Each unique combination has the same number of basis colors, where a given basis color can be repeated one or more times within a particular unique combination. For instance, for a two color-by-two color rectangular grid of the basis colors red, green, blue, and black, one possible unique combination is red in the upper left-hand corner, green in the upper right-hand corner, blue in the lower left-hand corner, and black in the lower right-hand corner. Another example is red in the upper left-hand corner, red in the upper right-hand corner, blue in the lower left-hand corner, and blue in the lower right-hand corner. In the latter example, however, it is difficult to determine the boundaries of such a color code, since there is no difference in color between the left side of this unique combination of the basis colors and the right side of this unique combination of the basis colors.

In general, the candidate set of unique combinations of the basis colors is determined in part 304 such that each unique combination within this candidate set maximizes discernment among the boundaries, or edges, of the colors within the unique combination. For instance, as noted above, having red in the upper left- and upper right-hand corners and blue in the lower left- and lower right-hand corners makes it difficult to discern the boundaries of such a color code. This is because the upper left-hand corner and the upper right-hand corner have the same color, and because the lower left-hand corner and the lower right-hand corner have the same color. As such, discerning the boundary between the upper left- and upper right-hand corners, and the boundary between the lower left- and lower right-hand corners, is difficult at best.

Similarly, a color code having the same first color in the upper left-hand corner and in the lower left-hand corner, and the same second color code in the upper right-hand corner and in the lower right-hand corner, makes it difficult at best to discern the boundary between the upper and lower left-hand corners, and the boundary between the upper and lower right-hand corners. However, a color code having the same first color in the upper left-hand corner and in the lower right-hand corner, and the same second color in the upper right-hand corner and in the lower left-hand corner, does not make it difficult to discern the boundaries of the colors within such a color code. This is because the colors of each set of two adjacent colors within this color code are unique.

It is noted that, as one example, for a color code made up of a two color-by-two color grid, a valid such color code is one that has at least three distinguishable color boundaries. This means that a color code having red in the upper right-hand and left-hand corners, green in the lower left-hand corner, and blue in the lower right-hand corner, for instance, is still valid. This is because even though the boundary between the upper right-hand and left-hand corners cannot be discerned, this boundary can nevertheless be extrapolated from the boundary between the lower right-hand and left-hand corners.

Part 304 may be performed by first determining the total number of possible unique combinations of the same number of basis colors (306). For unique combinations made up of R colors-by-S colors grids, the total number of unique combinations is $C^{R \times S}$. Thereafter, one or more unique combinations are removed from this total number of possible unique combinations to realize the candidate set (308). For instance, difficult-to-discern unique combinations, examples of which have been described above, may be removed. Another difficult-to-discern unique combination of colors is a color code having the same color in each of the four corners of the color code, for a color code made up of a two colors-by-two colors grid. More generally, a difficult-to-discern unique combination of colors is a color code having the same color in adjacent locations within an R colors-by-S colors grid. Ultimately, one of the unique combinations within the candidate set is selected to form a color code 108 of the pattern 100 (310), where this process is repeated for every color code 108 of the pattern 100. The selection process is may be subject to various constraints, such as repeatability of a given unique combination within the pattern 100, rotational invariance, and so on. The result is the pattern 100 that has been described. By selecting unique combinations of the same number of basis colors from the candidate set for the color codes 108, the colors 102 of the pattern 100 are automatically generated as well.

As another example, part 202 of the method 200 can be performed in actuality by using an exhaustive search approach and/or a greedy optimization approach to determine the color codes 108 of the pattern 100. As still another example, a universal cycle of permutations can be used to determine the color codes 108 of the pattern 100 in a group of colors-by-group of colors manner through the pattern 100 to perform part 202 of the method 200. That is, starting with a one-dimensional sequence of the basis colors for a first group of colors of the pattern 100, each successive group of colors of the pattern 100 is determined as a permutation of an immediately adjacent previous group.

For instance, this approach may start with a one-dimensional sequence formed by all C(C-1) pairs (i.e., groups) of basis colors, which is equivalent to a universal cycle of two-permutations from the set of C colors. The initial sequence fills the left-most column of the pattern 100, and each subsequent column is replicated from the previous column, shifted up (and wrapped around if needed) by the column number. It is further noted that a portion of the complete pattern 100 may be cropped if the complete pattern 100 is not needed.

FIG. 4 shows a method 400 for determining at least the correspondence mapping in part 206 of the method 200, according to an example of the disclosure. The color of each pixel within the image is classified, and each pixel is assigned to a cluster corresponding to its color (402). That is, the pixels are clustered according to their colors, where the clusters are themselves separated by a minimum distance within a color space, and where centroids of the clusters are updated based on the pixels assigned to the clusters. For instance, a k-means approach can be used to classify and cluster the pixels.

In the method 400, the basis colors that make up the colors 102 of the pattern 100 can be known a priori. Any pixel within the image that has a color deviating by more than a threshold from a basis color is masked within the image (404), and is not considered further in the method 400. That is, masked pixels are considered as not being part of the pattern 100 within the image. The clusters that remain after the masked pixels are removed correspond to the colors 102 within the pattern 100, over which the color codes 108 are defined.

For each intersection of two-by-two (or, more generally, R-by-S) groupings of these clusters within the image, discounting any pixel that has been masked, it is determined whether the intersection corresponds to a valid color code 108 of the pattern 100 (406). An intersection is one manner by which a color code 108 can be said to have spatial coordinates, as noted above. That is, the spatial coordinates of the intersection of the four colors of a color code 108 arranged in a two color-by-two color grid (i.e., where corners of the four colors of the color code 108 meet) can be considered the spatial coordinates of the color code 108. For such a color code 108, the intersection of the four colors of the color code 108 corresponds to the center point of the color code 108. What is known as a corner detection or a sliding window approach can be employed to determine whether an intersection includes a number of basis colors that likely forms a valid color code 108.

A color code 108 can be considered valid in one of two ways. First, the valid (i.e., permissible) color codes 108, or a valid (i.e., permissible) pattern 100 may be known a priori. Therefore, the intersections can be compared to the valid color codes 108 to ensure that they indeed correspond to valid color codes 108, and/or the intersections can be analyzed to ensure that they conform to the color codes 108 of a valid pattern 100. Second, where just the basis colors are known a priori, it can be determined whether each intersection of clusters includes just clusters corresponding to these basis colors. Both the first and second approaches can take into account that each color code 108 is a unique combination of these basis colors, as described above. Therefore, if two color codes 108 are found to be identical, then one of these two color codes 108 has not been detected properly.

The spatial coordinates of each intersection that corresponds to a valid color code 108 are mapped to reference spatial coordinates of the pattern 100 as is known a priori (408). As such, a correspondence mapping between the spatial coordinates of the intersections within the image captured by the camera and the reference spatial coordinates of the color codes 108 within the original pattern 100 as is known a priori is generated. A model may be used to fit the spatial coordinates of the intersections within the image to the reference spatial coordinates of the color codes within the original pattern 100 to locate the pattern 100 within the image captured by the camera.

Part 408 thus can be said to decode the geometric information contained within the pattern 100. The two-dimensional (or even three-dimensional) spatial coordinates of the intersections are mapped to a priori known two-dimensional or three-dimensional spatial coordinates of the color codes 108 within the pattern 100. This mapping is the correspondence mapping that has been described.

Furthermore, a color transformation can be generated to transform the color space of the camera to the a priori known reference color space of the pattern 100 (410), based on the colors. This color transformation may also be referred to as a color mapping, and can be a one-, two, three-, or most generally an n-dimensional color mapping. As one example, a matrix is generated based on the clusters that are part of intersections corresponding to valid color codes. In this case, it is assumed that the color transformation can be represented by a linear three-by-three matrix. The cluster centroids for each basis color can thus be used in a linear least squares formulation to solve directly for the color transformation matrix. However, other approaches and techniques can instead be used.

Part 410 therefore decodes the color information contained within the pattern 100. For instance, the reference color space of the pattern 100 may be known a priori, insofar as the basis colors of the pattern 100 may be known beforehand, such that the reference color space of the pattern 100 is known a priori. The clusters that correspond to these basis colors provide the color space of the camera itself. As such, a mapping—i.e., a transformation—between the clusters corresponding to the basis colors and the known values of the basis colors is generated. It is noted that, implicitly, the pattern 100 can be used to capture spatially varying color properties and/or illumination effects of the scene within the captured image.

FIG. 5 shows a method 500 for detecting the pattern 100 within an image captured by a camera in part 206 of the method 200, according to another example of the disclosure. Potential color codes 108 of the pattern 100 are detected within the image (502). As one example, a color-based Harris corner detection technique is used to robustly detect potential intersections of the pattern 100 within the image, where these potential intersections correspond to potential color codes 108 of the pattern. Non-maximal suppression and local clustered filtering may further be performed to improve robustness. As one example, just the color codes 108 corresponding to the most likely candidate intersections are retained, such as the top ten-percent of the most likely candidate intersections.

Furthermore, for each color group of a number of different color groups over which the basis colors have been organized, each pixel of the image is classified as one of the basis colors within each color group (504). For instance, the basis colors may a priori be known as red, green, blue, cyan, magenta, yellow, black, and white. The basis colors are divided into three groups, or sets: red, green, and blue; cyan, magenta, and yellow; and, black and white. Each pixel is thus classified as a color within each group. For instance, a particular pixel may be considered as green in the first group, as cyan in the second group, and as black in the third group. Assigning each pixel a color of more than one group provides for robustness in decreasing the potential for false negatives. Determining which group of colors a pixel is actually a part—i.e., determining which color a pixel actually is—is then performed later in the method 500.

The potential, or candidate, color codes 108 of the pattern 100 that have been detected in part 502 are validated to prune the number of potential color codes 108 even further (506), based on the results of part 504. Since a valid color code 108 should lie at an intersection of four basis colors, a three-by-three quadrant may be analyzed with respect to each potential intersection to determine whether the majority of each such quadrant includes just one basis color. Potential color codes 108 that have four valid quadrants are compared to a priori knowledge of permissible color codes 108 within the pattern 100, for color codes having four colors. More generally, potential color codes 108 that have R-times-S valid quadrants are compared to a priori knowledge of permissible color codes within the pattern 100, for color codes having R-times-S colors. If a potential color code 108 is not a permissible color code 108, then it is removed from the candidate set of potential color codes 108 to remove this potential color code 108 from further consideration.

The result of part 506 is a list of pruned candidate color codes 108, corresponding to a list of pruned intersections, that are permissible color codes 108 within the pattern 100. For instance, each color code 108 within the pattern 100 may have underlying reference grid coordinates $P_r(j,i)=(x_{ji},y_{ji})$, where j and i indicate the column and row, respectively, of the color code 108. The camera space itself may have corresponding points $P_c(j,i)=(u_{ji},v_{ji})$. Therefore, a given reference coordinate for a color code 108 $P_r(j,i)$ is associated with all potential camera space candidates for this color code, $\hat{P}_c(j,i;k)$, k=1 . . . K (j,i).

The pattern 100 is then detected within the image by solving a dynamic programming problem, based on the potential candidate color codes 108 as have been pruned in part 506, and based on the basis colors of the colors groups within which each pixel of the image has been classified in part 504 (508). The dynamic program is employed along each row of the pattern 100 to leverage the spatial relationship of the color codes 108 within the pattern 100, as optimized during the pruning process. As one example, the dynamic program examines a list of candidate points between adjacent reference coordinates. Additional candidate points are added by the dynamic program to signify occlusion. Constraints within the edge segments are enforced by the dynamic program to better exploit edge connectivity along a given row in the pattern 100. Edge nodes are thus formed between each possible combination of candidate points in adjacent reference coordinates, including any occluded placeholders.

Mathematically, $E_r(j,i)$ denotes an edge segment connecting reference points $P_r(j,i)$ and $P_r(j+1,i)$, such that $E_r(j,i)=\{P_r(j,i),P_r(j+1,i)\}$. Similarly, $E_c(j,i)$ denotes the corresponding edge segment in the camera space, such that $E_c(j,i)=\{P_c(j,i),P_c(j+1,i)\}$. The edge segment connecting candidate camera points $\hat{P}_c(j,i;m)$ and $\hat{P}_c(j+1,i;n)$ is defined as $E_c(j,i;m,n)$. That is, $E_c(j,i;m,n)=\{\hat{P}_c(j,i;m),\hat{P}_c(j+1,i;n)\}$.

For each such edge segment, the segment length and orientation are recorded. The segment length is:

$$d(j,i;m,n)=\|\hat{P}_c(j,i;m)-\hat{P}_c(j+1,i;n)\|. \quad (1)$$

The segment orientation is:

$$\theta(j,i;m,n) = \cos^{-1}\frac{\hat{P}_c(j,i;m)\cdot\hat{P}_c(j+1;n)}{\|\hat{P}_c(j,i;m)\|\|\hat{P}_c(j+1;n)\|}. \quad (2)$$

Edges with nearly zero lengths (i.e., d<ε) are discarded. Each edge node is assigned an initial cost J(j,i;m,n), based on the likelihood of forming an edge that borders two basis colors. In this respect, points are sampled just above and below the edge, and compared to the expected basis colors.

The dynamic programming problem is solved to determine the minimum cost solution through the candidate edges. The cost C(j,i;m,n,o,p) of connecting edge segment $E_c(j,i;m,n)$ and $E_c(j+1,i;o,p)$ is given by:

$$C(j,i;m,n,o,p)=J(j,i;m,n)+C_{dist}\Delta d(j,i;m,n,o,p)+C_{angle}\Delta\theta(j,i;m,n,o,p)+C_{occl}. \quad (3)$$

In equation (3), $\Delta d(j,i;m,n,o,p)=\|d(j,i;m,n)-d(j+1,i;o,p)\|$ is the edge length difference, and $C_{dist}\Delta d$ penalizes large differences in edge lengths. Furthermore, $\Delta\theta(j,i;m,n,o,p)=\|\theta(j,i;m,n)-\theta(j+1,i;o,p)\|$ is the edge orientation difference, and $C_{angle}\Delta\theta$ penalizes for large differences in orientation. Finally, $C_{occl}$ provides a penalty if an occluded placeholder is selected, and is otherwise zero.

To ensure edge connectivity, just n=o cases are considered. For instance, if $\vec{g}_{ji}$ represents the set of candidate edge segments for $E_c(j,i;m,n)$, then a given solution path G incurs a cost $$T(G) = \sum_x C(x,i;\vec{g}_{xi}).$$

As such, the solution to the dynamic programming problem locates the path that minimizes T(G). Additional processing may be employed to prune invalidate candidate edges and discard outliers.

FIG. 6 shows a system 600, according to an example of the disclosure. The system 600 may be implemented as a computing device, for instance, or over a number of computing devices that are in communicative connection with one another over a network. The system 600 includes a processor 604 and a non-transitory computer-readable data storage medium 606 that stores a computer program 608 executable by the processor 604. The system 600 includes a pattern detection component 610, a camera calibration component 612, and/or a pattern generation component 614. The components 610, 612, and 614 may each be implemented by the computer program 608.

The pattern detection component 610 detects the pattern 100 within an image captured by a camera, and determines the correspondence mapping and the color transformation between the pattern 100 detected within the image and the original pattern 100, as has been described. The camera may be part of the system 600. The camera calibration component 612 performs geometric calibration of the camera using the geometric information encoded within the pattern 100 detected within the image. The component 612 also performs color calibration of the camera using the color information encoded within the pattern 100 detected within the image. Finally, the pattern generation component 614 generates and outputs the pattern 100 for capturing by the camera within an image.

Where the system 600 is implemented over a number of computing devices communicatively connected to one another over a network, each computing device may include a processor 604 and a computer program 608. One computing device may be a mobile computing device that captures the image of the pattern 100, and which the sends this image to another computing device over a network like the Internet. This latter computing device includes the pattern detection component 610, and the results of the pattern detection are sent back to the mobile computing device.

Examples of the disclosure described herein are amenable to modifications and extensions as well. For instance, the pattern 100 that has been described includes uniform spacing between colors of the color codes 108 and between the color codes 108. However, such spacing may be non-uniform as well. The pattern 100 may be curved or otherwise distorted, too, and does not have to be a rectangular grid.

Furthermore, the pattern 100 that has been described is a static unchanging pattern, but can alternatively be a dynamically changing pattern. For instance, different patterns 100 can be electronically displayed at different times. In addition, the pattern 100 can be rotationally invariant. That is, either the pattern 100 as variously rotated can be tracked, or the pattern 100 can be formed in such a way that it is inherently rotationally invariant.

Finally, the pattern 100 has been described as being useful for geometric calibration and color calibration of a camera. However, the pattern 100 may be used for other purposes as well. For instance, the vignetting and/or illumination within the image captured by the camera can be estimated based on the pattern 100 within this image.

We claim:

1. A method comprising:
   generating, by a processor, a camera lens geometrical calibration pattern to reduce lens distortion thereof using geometric information encoded in the pattern, the pattern comprising:
   a plurality of color patches organized over a spatial configuration having a plurality of columns and a plurality of rows, each color patch selected as one of a plurality of different basis colors lesser in number than a number of the color patches, the color patches including a plurality of corner color patches appear at corners of the spatial configuration;
   a plurality of color codes, each color code defined as a contiguous number of the color patches in a particular spatial configuration, each color code having a same number of the color patches, each different basis color appearing once in each color code, the color codes overlapping one another spatially with respect to the color patches,
   wherein each color patch except the corner color patches appears in more than one of the color codes, and the particular spatial configuration of the contiguous number of the color patches of each color code is unique as compared to the particular spatial configuration of the contiguous number of the color patches of any other of the color patches; and
   outputting the pattern, by the processor.

2. The method of claim 1, wherein the spatial configuration is an M colors-by-N colors rectangular grid, and each color code is an R colors-by-S colors rectangular grid, such that each color code overlaps at least three other color codes within the pattern.

3. The method of claim 2, wherein generating the pattern comprises:
   determining the number of different basis colors, where C is equal to the number of different basis colors;
   determining a candidate set of unique combinations of the same number of colors, based on a total number of possible unique combinations of the same number of colors selected from the number of different basis colors, the total number of possible unique combinations equal to $C^{R \times S}$; and,
   for each color code of the pattern, determining the color code as one of the candidate set of unique combinations.

4. The method of claim 3, wherein determining the candidate set of unique combinations comprises:
   determining the total number of possible unique combinations;
   removing one or more unique combinations from the total number of possible unique combinations to realize the candidate set of unique combinations.

5. The method of claim 1, wherein generating the pattern comprises:
   using one or more of an exhaustive search approach and a greedy optimization approach to determine the color codes of the pattern.

6. The method of claim 1, wherein generating the pattern comprises:
   starting with a one-dimensional sequence of the different basis colors for a first group of the colors of the pattern, determining each group of one or more additional groups of the colors of the pattern as a permutation of a previous group.

7. The method of claim 1, wherein outputting the pattern comprises one or more of:
   storing the pattern on a non-transitory computer-readable data storage medium;
   printing the pattern on a physical medium using a printing device; and,
   electronically displaying the pattern using a display device.

8. A non-transitory computer-readable data storage medium storing a computer program for execution by a processor to perform a method comprising:
   determining a correspondence mapping between spatial coordinates of a pattern as detected within an image captured by a camera and reference spatial coordinates of the pattern as known beforehand; and
   geometrically calibrating the camera to reduce lens distortion thereof using the geometric information encoded by the pattern,
   wherein the pattern comprises:
   a plurality of color patches organized over a spatial configuration having a plurality of corners, each color patch selected as one of a plurality of basis colors lesser in number than a number of the color patches, the color patches including a plurality of corner color patches appear at the corners of the spatial configuration;
   a plurality of color codes, each color code defined as a contiguous number of the color patches in a particular spatial configuration, each color code having a same number of the color patches, each basis color appearing once in each color code, the color codes overlapping one another spatially with respect to the color patches,
   and wherein each color patch except the corner color patches appears in more than one of the color codes, and the particular spatial configuration of the contiguous number of the color patches of each color code is unique as compared to the particular spatial configuration of the contiguous number of the color patches of any other of the color patches.

9. The non-transitory computer-readable data storage medium of claim 8, wherein the method further comprises determining a color transformation between colors of the pattern as detected within the image and colors of the pattern as known beforehand.

10. The non-transitory computer-readable data storage medium of claim 9, wherein the method further comprises using the color transformation to aid color calibration of the camera.

11. The non-transitory computer-readable data storage medium of claim 8, wherein the method further comprises using the correspondence mapping to aid geometric calibration of the camera.

12. The non-transitory computer-readable data storage medium of claim 8, wherein determining the corresponding mapping comprises:
  for each pixel of a plurality of pixels within the image, classifying a color of the pixel, and clustering the pixel into one of a plurality of clusters that corresponds to the color of the pixel, the clusters being separated from one another by a minimum distance within a color space;
  masking any pixel within the image that deviates by more than a threshold from any of the basis colors;
  for each intersection of a plurality of intersections of groupings of the clusters within the image, where any pixel that has been masked within the image is discounted, determining whether the intersection corresponds to a valid color code; and,
  mapping each intersection that corresponds to a valid color code to a reference coordinate of the pattern.

13. The non-transitory computer-readable data storage medium of claim 8, wherein detecting the pattern within the image captured by the camera comprises:
  detecting a plurality of potential color codes of the pattern within the image;
  for each pixel of a plurality of pixels within the image, for each color group of a plurality of different color groups over which the basis colors have been organized, classifying the pixel as one of the basis colors of the color group;
  validating the potential color codes of the pattern detected within the image to prune a number of the potential color codes within the pattern; and,
  detecting the pattern within the image, based on the potential color codes of the pattern as have been pruned, and based on the basis colors of the color groups within which each pixel has been classified.

14. A system comprising:
a processor;
a non-transitory computer-readable data storage medium to store a computer program executable by the processor; and,
a pattern detection component implemented by the computer program to:
  detect a pattern within an image captured by a camera; and
  geometrically calibrate the camera to reduce lens distortion thereof using geometric information encoded by the pattern,
wherein the pattern comprises:
  a plurality of color patches organized over a spatial configuration having a plurality of corners, each color patch selected as one of a plurality of basis colors lesser in number than a number of the color patches, the color patches including a plurality of corner color patches appear at the corners of the spatial configuration;
  plurality of color codes each color code defined as a contiguous number of the color patches in a particular spatial configuration each color code having a same number of the color patches, each basis color appearing once in each color code, the color codes overlapping one another spatially with respect to the color patches,
and wherein each color patch except the corner color patches appears in more than one of the color codes and the particular spatial configuration of the contiguous number of the color patches of each color code is unique as compared to the particular spatial configuration of the contiguous number of the color patches of any other of the color patches.

15. The method of claim 1, further comprising:
detecting the pattern by a lens of a camera; and
geometrically calibrating the camera to reduce the lens distortion thereof using the geometric information encoded by the pattern.

* * * * *

UNITED STATES PATENT AND TRADEMARK OFFICE
CERTIFICATE OF CORRECTION

PATENT NO. : 8,687,068 B2  Page 1 of 1
APPLICATION NO. : 12/885528
DATED : April 1, 2014
INVENTOR(S) : Nelson Liang An Chang et al.

It is certified that error appears in the above-identified patent and that said Letters Patent is hereby corrected as shown below:

In the Specification:

In column 14, line 26, in Claim 14, before "plurality" insert -- a --.

In column 14, line 26, in Claim 14, delete "codes" and insert -- codes, --, therefor.

In column 14, line 28, in Claim 14, delete "configuration" and insert -- configuration, --, therefor.

In column 14, line 34, in Claim 14, delete "codes" and insert -- codes, --, therefor.

Signed and Sealed this
Fifth Day of August, 2014

Michelle K. Lee
*Deputy Director of the United States Patent and Trademark Office*